United States Patent
Debaud et al.

(10) Patent No.: US 7,226,964 B2
(45) Date of Patent: *Jun. 5, 2007

(54) COMPOSITION COMPRISING A NITROXIDE, A PROMOTER AND OPTIONALLY A FREE-RADICAL INITIATOR

(75) Inventors: Fabien Debaud, Lyons (FR); Alfredo Defrancisci, Lyons (FR); Olivier Guerret, Mazerolles (FR); Jacques Kervennal, Lyons (FR)

(73) Assignee: ARKEMA France, Puteaux (FR)

( * ) Notice: Subject to any disclaimer, the term of this patent is extended or adjusted under 35 U.S.C. 154(b) by 163 days.

This patent is subject to a terminal disclaimer.

(21) Appl. No.: 10/406,009

(22) Filed: Apr. 3, 2003

(65) Prior Publication Data

US 2004/0195550 A1    Oct. 7, 2004

(51) Int. Cl.
  *C08K 5/34*     (2006.01)
  *C08K 5/3492*   (2006.01)
  *C08K 5/32*     (2006.01)
  *C08K 5/16*     (2006.01)

(52) U.S. Cl. ............... 524/100; 524/102; 524/205; 524/218; 524/221; 524/259; 524/260; 252/401

(58) Field of Classification Search ........... 524/100, 524/102, 205, 218, 221, 259, 260; 252/401
See application file for complete search history.

(56) References Cited

U.S. PATENT DOCUMENTS 4,665,185 A * 5/1987 Winter et al. ............... 546/184
5,877,344 A * 3/1999 Gande et al. ............... 560/205
6,660,181 B2 * 12/2003 Benage et al. ......... 252/183.12
6,767,940 B2 * 7/2004 Voorheis et al. ............... 524/89
6,919,481 B1 * 7/2005 Hayashi et al. ............. 564/300

FOREIGN PATENT DOCUMENTS

| EP | 0499581 A1 | 8/1992 |
| EP | 0870798 A1 | 10/1998 |
| EP | 0903354 A1 | 3/1999 |
| JP | 11049865   | 2/1999 |
| JP | 11049865 A | 2/1999 |
| WO | WO 0002207 | 1/2000 |
| WO | WO 0055211 | 9/2000 |
| WO | WO 01/84551 | * 5/2001 |

OTHER PUBLICATIONS

International Search Report dated Jan. 31, 2002, for Application No. PCT/FR01/03011.
Database WPI, Section Ch, Derwent Publications Ltd., London, GB, Class A00, AN 1968-97777P, XP002168780 & SU 191 779 A (Kuz'Minskii as (Resin Ind Res Inst)), Abstract.

* cited by examiner

*Primary Examiner*—Kriellion Sanders
(74) *Attorney, Agent, or Firm*—Steven D. Boyd

(57) ABSTRACT

The present invention relates to the prevention of scorching before crosslinking of a thermoplastic and/or elastomeric composition with peroxides or azo compounds. This is achieved by using a nitroxide in combination with at least one crosslinking promoter (promoter) chosen from group (P) consisting of compounds containing at least one double bond, which may be difunctional or polyfunctional.

31 Claims, No Drawings

COMPOSITION COMPRISING A NITROXIDE, A PROMOTER AND OPTIONALLY A FREE-RADICAL INITIATOR

BACKGROUND OF THE INVENTION (i) Field of the Invention

The present invention relates to the prevention of scorching before crosslinking of a thermoplastic and/or elastomeric composition with peroxides or azo compounds.

(ii) Description of Related Art

Premature crosslinking (scorching) during the preparatory phase is a major difficulty in the use of peroxides and azo compounds in crosslinking (curing) applications of elastomeric and/or thermoplastic materials. The preparatory phase consists in general in blending the constituents and optionally extruding them at temperatures that are often high. The operating conditions of this preparatory phase quite often lead to decomposition of the peroxide or azo initiator, thus inducing the crosslinking reaction with formation of gel particles in the bulk of the blend. The presence of these gel particles leads to imperfections (inhomogeneity or surface roughness) of the final product. Excessive scorching reduces the plastic properties of the material, such that the said material can no longer be converted, leading to loss of the entire batch. In addition, excessive scorching may lead to the total stoppage of the extrusion operation.

Several solutions have been proposed to overcome this drawback. Thus, it has been proposed to use an initiator with a half-life of 10 hours at high temperature. The drawbacks of this approach are the low production efficiency due to a long curing time and the high energy costs.

It has also been proposed to incorporate certain additives in order to reduce the scorch tendency. Thus, the use of organic hydroperoxides as scorch inhibitors for polyethylene-based compositions crosslinked with a peroxide was described in British patent GB 1,535,039. The use of vinyl monomers was the subject of patent U.S. Pat. No. 3,954,907. The use of nitrites was described in patent U.S. Pat. No. 3,202,648. Patent U.S. Pat. No. 3,335,124 describes the use of aromatic amines, phenolic compounds, mercaptothiazole compounds, sulphides, hydroquinones and dialkyl dithiocarbamate compounds.

Very recently, the use of 2,2,6,6-tetramethylpiperidyloxy (TEMPO) and 4-hydroxy-2,2,6,6-tetramethylpiperidyloxy (4-hydroxy TEMPO) was the subject of a Japanese patent application JP 11-49865.

However, the use of the additives of the art cited above to increase the scorch-resistance time has a harmful effect on the curing time and/or on the final crosslinking density. It leads, therefore, to a reduction in the production efficiency and/or properties of the final product.

SUMMARY OF THE INVENTION

The present invention eliminates the drawbacks of the cited art since it makes it possible to improve the scorch resistance or the crosslinking density without this having a negative impact on the crosslinking time. This is achieved by using a nitroxide in combination with at least one crosslinking promoter (promoter) chosen from group (P) consisting of compounds containing at least one double bond, which may be difunctional or polyfunctional. Mention may be made, by way of example, of difunctional vinyl monomers, difunctional allylic monomers, polyfunctional vinyl monomers and polyfunctional allylic monomers.

The aim of the present invention is to provide a scorch-retardant composition comprising a nitroxide and at least one promoter chosen from the group (P). The nitroxide is preferably used in weight proportions ranging from 1:0.2 to 1:5 and advantageously between 1:0.5 and 1:2 relative to the amount of promoter present.

One aim of the present invention is also to provide a scorch-retardant curing/crosslinking composition (A), comprising a free-radical initiator chosen from the group consisting of organic peroxides, azo compounds and mixtures thereof, a nitroxide and at least one promoter chosen from the group (P). The free-radical initiator is preferably used in weight proportions of from 1:0.02 to 1:1 and advantageously from 1:0.1 to 1:0.5 relative to the amount of nitroxide present.

The free-radical initiator is preferably used in weight proportions of from 1:0.02 to 1:1 and advantageously from 1:0.1 to 1:0.5 relative to the amount of promoter used.

The present invention also provides a crosslinkable composition (B) comprising a thermoplastic polymer and/or an elastomeric polymer which may be crosslinked by means of a peroxide or an azo compound, a free-radical initiator chosen from the group consisting of organic peroxides and azo compounds and mixtures thereof, a nitroxide and at least one promoter chosen from group (P). The free-radical initiator preferably represents between 0.2 and 5 parts and advantageously between 0.5 and 3 parts per 100 parts by weight of polymer. The proportions of nitroxide and of promoter used relative to the free-radical initiator are preferably in the region of those used for composition (A).

The present invention also provides a process for crosslinking a crosslinkable composition comprising a thermoplastic polymer and/or an elastomeric polymer which may be crosslinked using a peroxide or an azo compound, in which the said polymer is mixed with a free-radical initiator chosen from the group consisting of organic peroxides, azo compounds and mixtures thereof, in the presence of a nitroxide combined with at least one promoter chosen from the group (P).

The present invention also provides molded or extruded articles such as wires and electrical cables obtained from a crosslinkable composition (B).

DETAILED DESCRIPTION OF PREFERRED EMBODIMENTS

Advantageously, the promoters chosen from the group (P) are trans-stilbene, divinylbenzene, trans, trans-2,6-dimethyl-2,4,6-octatriene, dicyclopentadiene, 3,7-dimethyl-1,3,6-octatriene (OCIMENE), the compounds represented by the general formula (I):

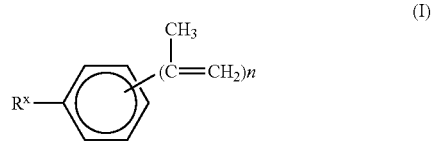

in which $R^x$ represents a hydrogen atom or an alkyl group of 1 to 9 carbon atoms and n is an integer between 1 and 3, and the compounds represented by the general formula (II):

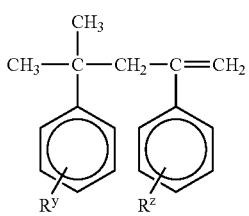

in which $R^y$ and $R^z$, which may be identical or different, represent an alkyl group of 1 to 4 carbon atoms.

As to compounds represented by the general formula (I), mention may be made of α-methylstyrene, ortho-, meta- and para-diisopropenylbenzene, 1,2,4-triisopropenylbenzene, 1,3,5-triisopropenylbenzene, 3-isopropyl-ortho-diisopropenylbenzene, 4-isopropyl-ortho-diisopropenylbenzene, 4-isopropyl-m-diisopropenylbenzene, 5-isopropyl-m-diisopropenylbenzene and 2-isopropyl-p-diisopropenylbenzene.

As to compounds represented by the general formula (TII), mention may be made of 2,4-bis(3-isopropylphenyl)-4-methyl-1-pentene, 2,4-bis(4-isopropylphenyl)-4-methyl-1-pentene, 2-(3-isopropylphenyl)-4-(4-isopropylphenyl)-4-methyl-1-pentene, 2-(4-isopropylphenyl)-4-(3-isopropylphenyl)-4-methyl-1-pentene, 2,4-bis(3-methylphenyl)-4-methyl-1-pentene and 2,4-bis(4-methylphenyl)-4-methyl-1-pentene.

Methyl methacrylate, lauryl methacrylate, allyl methacrylate, trimethylolpropane triacrylate, triallyl cyanurate (TAC), triallyl isocyanurate (TAIC), triallyl phosphate, tetraallyloxyethane, diallyldiglycol carbonate, triallyl trimellitate, triallyl citrate, diallyl adipate, diallyl terephthalate, diallyl oxalate, diallyl fumarate, ethylene glycol dimethacrylate and 2-hydroxyethyl methacrylate may also be suitable as promoters.

Compounds suitable as promoters from the group (P) may also include the compounds represented by the general formula (X)

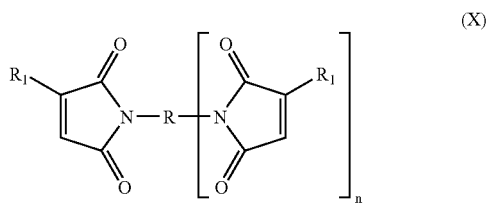

in which n is 1 or 2 and R is divalent or trivalent and comprises aliphatic acyclic groups having 2 to 16 carbon atoms, aliphatic cyclic groups having 5 to 20 carbon atoms, aromatic groups having 6 to 18 carbon atoms and alkyl aromatic (alkylaryl) groups having 7 to 24 carbon atoms, and these divalent or trivalent groups may contain one or more oxygen, nitrogen and/or sulphur heteroatoms in replacement of one or more carbon atoms, and each $R_1$ is identical and represents a hydrogen atom or an alkyl group having 1 to 18 carbon atoms.

Among the compounds of general formula (X), the bismaleimides and the biscitraconimides are advantageously selected.

As to bismaleimide, mention may be made of N,N'-m-phenylenebismaleimide, N,N'-ethylenebismaleimide, N,N'-hexamethylenebismaleimide, N,N'-dodecamethylenebismaleiminde, N,N'-(2,2,4-trimethylhexamethylene) bismaleimide, N,N'-(oxydipropylene)bismaleimide, N,N'-(aminodipropylene)bismaleimide, N,N'-(ethylenedioxydipropylene)bismaleimide, N,N'-(1,4-cyclohexylene)bismaleimide, N,N'-(1,3-cyclohexylene) bismaleimide, N,N'-(methylene-1,4-dicyclohexylene) bismaleimide, N,N'-(isopropylidene-1,4-dicyclohexylene) bismaleimide, N,N'-(oxy-1,4-dicyclohexylene) bismaleimide, N,N'-p-(phenylene)bismaleimide, N,N'-(o-phenylene)bismaleimide, N,N'-(1,3-naphthylene) bismaleimide, N,N'-(1,4-naphthylene)bismaleimide, N,N'-(1,5-naphthylene)bismaleimide, N,N'-(3,3'-dimethyl-(4,4-diphenylene)bismaleimide, N,N'-(3,3-dichloro-4,4-biphenylene)bismaleimide, N,N'-(2,4-pyridyl) bismaleimide, N,N'-(2,6-pyridyl)bismaleimide, N,N'-(1,4-anthraquinonediyl)bismaleimide, N,N'-(m-tolylene) bismaleimide, N,N'-(p-tolylene)bismaleimide, N,N'-(4,6-dimethyl-1,3-phenylene)bismaleimide, N,N'-(2,3-dimethyl-1,4-phenylene)bismaleimide, N,N'-(4,6-dichloro-1,3-phenylene)bismaleimide, N,N'-(5-chloro-1,3-phenylene) bismaleimide, N,N'-(5-hydroxy-1,3-phenylene) bismaleimide, N,N'-(5-methoxy-1,3-phenylene) bismaleimide, N,N'-(m-xylylene)bismaleimide, N,N'-(p-xylylene)bismaleimide, N,N'-(methylenedi-p-phenylene) bismaleimide, N,N'-(isopropylidenedi-p-phenylene) bismaleimide, N,N'-(oxydi-p-phenylene)bismaleimide, N,N'-(thiodi-p-phenylene)bismaleimide, N,N'-(dithiodi-p-phenylene)bismaleimide, N,N'-(sulphodi-p-phenylene)bismaleimide, N,N'-(carbonyldi-p-phenylene)bismaleimide, α,α'-bis(4-maleimidophenyl)-meta-diisopropylbenzene, α,α'-bis(4-p-phenylene)bismaleimide and α,α'-bis(4-maleimidophenyl)-para-diisopropylbenzene.

As to biscitraconimides, mention may be made of the following:
1,2-N,N'-dimethylenebiscitraconimide;
1,2-N,N'-trimethylenebiscitraconimide;
1,5-N,N'-(2-methylpentamethylene)biscitraconimide; and
N,N'-(methylphenylene)biscitraconimide.

The compounds of general formula (X) are preferably selected so as to crosslink the elastomers.

Nitroxides which may be used, for example, are those represented by the general formula (III):

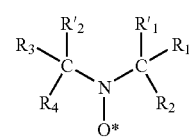

in which $R_1$, $R_2$, $R_3$, $R_4$, $R'_1$ and $R'_2$, which may be identical or different, represent a hydrogen atom, a halogen atom such as fluorine, chlorine, bromine or iodine, a linear, branched or cyclic, saturated or unsaturated hydrocarbon-based group such as an alkyl or phenyl radical, a polymer chain which may be, for example, a polyalkyl (meth)acrylate chain, for instance polymethyl methacrylate, a polydiene, polyolefin or polystyrene chain, a functionalized group such as a cyano —CN group, an ester —COOR group, an amide —CON(R)$_2$ group, an alkoxy —OR group or a phosphonate —PO(OR)$_2$ group in which R represents a hydrocarbon-based chain containing from 1 to 9 carbon atoms. In addition, $R'_1$ and $R'_2$ may be linked together to form a ring such as, for example, the nitroxides represented by the following formulae:

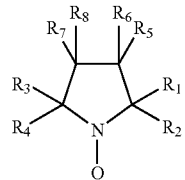
(IV)

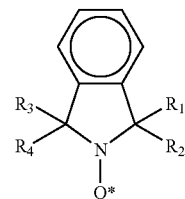
(V)

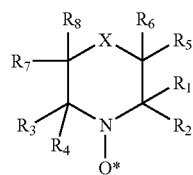
(VI)

in which $R_5$, $R_6$, $R_7$ and $R_8$, which may be identical or different, may comprise the same family of groups as that which has just been envisaged for $R_1$, $R_2$, $R_3$ and $R_4$ and, furthermore, may represent a hydroxyl —OH group, an acid group such as —COOH or —PO(OH)$_2$ or —SO$_3$H. Furthermore, X in formula (VI) represents a divalent group comprising methylene, —CH$_2$—, —C(OR)(OR')—, carbonyl —C(O)—, oxy —O— and —CHZ— with Z representing a monovalent residue comprising cyano: —CN, amino: —NRR', alkoxy: —OR, iminoyl —N=CRR', carboxylate: —OC(O)—R and amide: —NHR—C(O)R' groups, in which R and R', which may be identical or different, represent a hydrogen atom, a linear or branched alkyl group containing a number of carbon atoms ranging from 1 to 10, or a benzyl or phenyl group. X in formula (VI) may also represent a phosphonate group: —OP(O)R"R"' with R" and R"' having the same meaning as Z.

It is also possible to use the nitroxides represented by the general formula (VII)

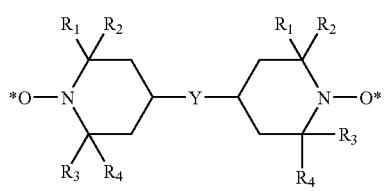
(VII)

in which $R_1$, $R_2$, $R_3$ and $R_4$, which may be identical or different, have the same meaning as those used for formulae (III) to (VI) and Y represents a divalent group comprising:
—OC(O)—(CR$_a$R$_b$)$_n$—C(O)O—,
—NH—(CR$_a$R$_b$)$_n$NH—,
—NHC(O)—(CR$_a$R$_b$)$_n$—C(O)NH—,
—S—, —O—; $R_a$ and $R_b$, which may be identical or different, represent a hydrogen atom or a linear or branched alkyl radical containing a number of carbon atoms ranging from 1 to 10 and n represents an integer ranging from 0 to 20.

In addition, it is possible to use the nitroxides represented by the general formula (VIII):

(VIII)

in which $R_1$, $R_2$, $R_3$ and $R_4$, which may be identical or different, have the same meaning as those in the above formulae (III) to (VII), λ is an integer between 1 and 20, $R_9$ represents an alkylene group containing a number of carbon atoms ranging from 2 to 12 which may be interrupted with an —O— or —NR$_{10}$— with $R_{10}$ denoting a hydrogen atom, an alkyl group containing a number of carbon atoms of between 1 and 12, or a cycloalkyl group, and Q represents a radical —OR$_{11}$, —NHR$_{12}$ or —NR$_{12}$R$_{13}$ in which $R_{11}$ represents a linear or branched alkyl radical containing a number of carbon atoms ranging from 1 to 12, a $C_3$-$C_{12}$ alkoxyalkyl radical, a cyclohexyl radical, a benzyl radical, a phenyl radical, a tolyl radical or a 2,2,6,6-tetrapiperidyl residue, $R_{12}$ and $R_{13}$ have the same meaning as $R_{11}$ and may moreover also form, together and with the nitrogen atom which bears them, a 5-, 6- or 7-membered heterocyclic radical which may also contain an oxygen.

The nitroxides of general formula (VIII) that are usually used are those obtained by oxidation of the amines sold by the company CIBA under the name Chimasorb 944 in which $R_1$, $R_2$, $R_3$ and $R_4$ each denote a methyl group, $R_9$ denotes an alkylene group containing 6 carbon atoms, Q represents a radical —N(O)—$C_8H_{11}$ and λ is an integer between 2 and 4.

The nitroxides of general formula (VI) that are preferred are those for which $R_1$, $R_2$, $R_3$ and $R_4$ each denote a methyl group, $R_5$, $R_6$, $R_7$ and $R_8$ each represent a hydrogen atom and X represents a group —CHZ—.

In particular, nitroxides of general formula (VI) which may be mentioned are 2,2,6,6-tetramethyl-1-piperidyloxy, generally sold under the name TEMPO, 4-hydroxy-2,2,6,6-tetramethyl-1-piperidyloxy, sold under the name 4-hydroxy TEMPO, 4-methoxy-2,2,6,6-tetramethyl-1-piperidyloxy, commonly known as 4-methoxy TEMPO, and 4-oxo-2,2,6,6-tetramethyl-1-piperidyloxy, commonly known as 4-oxo TEMPO.

The nitroxides of general formula (VI) that are particularly preferred are those represented by the following formula:

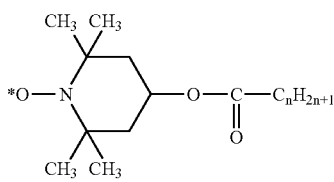

with n possibly ranging from 1 to 20.

Nitroxides such as 2,2,5,5-tetramethyl-1-pyrrolidinyloxy, sold under the brand name PROXYL, bis(1-oxy-2,2,6,6-tetramethyl-4-piperidyl) sebacate, sold under the brand name CXA 5415 by the company Ciba Specialty Chemical, 2,2,6,6-tetramethyl-4-hydroxy-1-piperidyloxy monophosphonate and 3-carboxy-2,2,5,5-tetramethylpyrrolidinyloxy (commonly known as 3-carboxy Proxyl) are also preferred.

According to the present invention, compounds which may be used as free-radical initiators are azo compounds and/or organic peroxides, which, upon thermal decomposition, produce free radicals which facilitate the curing/crosslinking reaction. Among the free-radical initiators used as crosslinking agents, dialkyl peroxides and diperoxyketal initiators are preferred. A detailed description of these compounds is found in *Encyclopedia of Chemical Technology*, 3rd edition, vol. 17, pages 27 to 90 (1982).

Among the dialkyl peroxides, the preferred initiators are: dicumyl peroxide, di-t-butyl peroxide, t-butylcumyl peroxide, 2,5-dimethyl-2,5-di(t-butylperoxy)hexane, 2,5-dimethyl-2,5-di(t-amylperoxy)hexane, 2,5-dimethyl-2,5-di(t-butylperoxy)-3-hexyne, 2,5-dimethyl-2,5-di(t-amylperoxy)-3-hexyne, α,α-di[(t-butylperoxy)isopropyl]benzene, di-t-amyl peroxide, 1,3,5-tri[(t-butylperoxy)isopropyl]benzene, 1,3-dimethyl-3-(t-butylperoxy)butanol and 1,3-dimethyl-3-(t-amylperoxy)butanol, and mixtures thereof.

Among the diperoxyketals, the preferred initiators are: 1,1-di(t-butylperoxy)-3,3,5-trimethylcyclohexane, 1,1-di(t-butylperoxy)cyclohexane, n-butyl 4,4-di(t-amylperoxy)valerate, ethyl 3,3-di(t-butylperoxy)butyrate, 2,2-di(t-amylperoxy)propane, 3,6,6,9,9-pentamethyl-3-ethoxycarbonylmethyl-1,2,4,5-tetraoxacyclononane, n-butyl 4,4-bis(t-butylperoxy)valerate and ethyl 3,3-di(t-amylperoxy)butyrate, and mixtures thereof.

Azo compounds which may be mentioned, for example, are 2,2'-azobis(2-acetoxypropane), azobisisobutyronitrile, azodicarbamide, 4,4'-azobis(cyanopentanoic acid) and 2,2'-azobismethylbutyronitrile.

Dicumyl peroxide and α,α'-di[(t-butylperoxy)isopropyl]benzene are particularly preferred.

The thermoplastic and/or elastomeric polymers taken into consideration in the present invention may be defined as natural or synthetic polymers which have a thermoplastic and/or elastomeric nature and which may be crosslinked (cured) under the action of a crosslinking agent. In *Rubber World*, "*Elastomer Crosslinking with Diperoxyketals*", October 1983, pages 26-32, and in *Rubber and Plastic News*, "*Organic Peroxides for Rubber Crosslinking*", 29 Sep. 1980, pages 46-50, the crosslinking action and crosslinkable polymers are described. Polyolefins which are suitable for the present invention are described in *Modern Plastics Encyclopaedia* 89, pages 63-67 and 74-75. By way of example of polymers and/or elastomers, mention may be made of linear low density polyethylene, low density polyethylene, high density polyethylene, chlorinated polyethylene, ethylene/propylene/diene terpolymers (EPDM), ethylene/vinyl acetate copolymers, ethylene/propylene copolymers, silicone rubber, natural rubber (NR), polyisoprene (IR), polybutadiene (BR), acrylonitrile-butadiene copolymers (NBR), styrene-butadiene copolymers (SBR), chlorosulphonated polyethylene and fluoroelastomers.

Mention may also be made of ethylene/methyl (meth) acrylate copolymers and ethylene/glycidyl methacrylate copolymers.

In addition to the constituents mentioned above, the compositions (A) and (B) may comprise antioxidants, stabilizers, plasticizers and inert fillers such as silica, clay or calcium carbonate.

The compositions (A) and (B) may comprise two or more nitroxides (N). They may also comprise two or more free-radical initiators.

According to the process of the present invention, the crosslinking temperature may be between 110 and 220° C. and preferably between 140 and 200° C.

Advantageously the process is implemented in the presence of an amount of initiator, nitroxide and promoter such that the initiator/polymer, nitroxide/polymer and promoter/polymer weight ratios are close to the composition (B).

The conversion of the crosslinkable compositions into molded or extruded articles may be carried out during or after crosslinking.

Experimental Section

In the text hereinbelow, the following abbreviations are used:

$M_H$: the maximum value of the torque obtained from the curve recorded by the rheometer. This value determines the crosslinking density.

$T_{90}$: crosslinking time, the time required to reach 90% of the maximum torque.

$T_{s5}$: scorch time, the time required at a given temperature for the torque to increase by 5 Mooney units.

The crosslinking density ($M_H$) and the crosslinking time ($T_{90}$) of the blend obtained were measured at 180° C. using a Monsanto ODR 2000 E rheometer (Alpha Technologies, oscillation arc: 3, oscillation frequency: 100 cycles/min).

The crosslinking time is also determined using the rheometer used under the same conditions as above.

The scorch time was measured at 145° C. using a Mooney MV 2000 viscometer (Alpha Technologies).

EXAMPLE 1

Not in Accordance with the Invention 1000 g of low density polyethylene (Mitene sold by Ashland), 25 g of dicumyl peroxide (Luperox® DC) and 3 g of 2,2,6,6-tetramethylpiperidyloxy (TEMPO) were mixed together in a turbomixer at 80° C. (nominal temperature) for 15 minutes (stirring speed=930 rpm). The powder was then converted into a sample in the form of a disc by melting at 110° C. for 3 min. The sample was then placed in the rheometer or viscometer chamber.

EXAMPLE 2

Not in Accordance with the Invention

Example 1 was repeated without the use of 2,2,6,6-tetramethylpiperidyloxy. The results are given in Table 1. Comparison of Examples 1 and 2 shows that the scorch time is higher in Example 1, but is accompanied by a large reduction in crosslinking density and by a slight increase in the crosslinking time.

EXAMPLE 3

Example 1 was repeated, adding 3 g of diisopropylbenzene (DIPB).

Comparison of the results with those obtained in the above examples shows unambiguously that such a combination makes it possible to maintain an increase in the scorch time while at the same time giving a higher crosslinking density and a lower crosslinking time.

TABLE 1

| | Additive(s) | Maximum torque at 180° C. ($M_H$) (N.m) | Scorch time at 145° C. ($T_{s5}$) (min/s) | Crosslinking time at 180° C. ($T_{90}$) (min/s) |
|---|---|---|---|---|
| Example 1 | TEMPO | 1.21 | 19:00 | 7:10 |
| Example 2 | — | 1.95 | 8:40 | 6:50 |
| Example 3 | TEMPO + DIPB | 2.88 | 19:10 | 6:02 |
| Example 4 | — | 5.94 | 2:50 | 5:21 |
| Example 5 | OH-TEMPO | 5.14 | 16:19 | 5:39 |
| Example 6 | MBM | 6.61 | 1:43 | 3:54 |
| Example 7 | OH-TEMPO + MBM | 6.45 | 14:38 | 4:46 |

EXAMPLE 4

Not in Accordance with the Invention 318 g of compound EPDM DIN 7863 (containing 100 g of ethylene-propylene-diene terpolymer and 218 g of fillers) were conditioned in a Banbury-type mixer with a volume of 350 cm³ at 50° C. for 5 minutes at a speed of 50 revolutions/min. 8 g of Luperox F40ED (40% di(tert-butylperoxyisopropyl)benzene and 60% inert fillers) were added and mixed with the compound for 5 minutes at 50° C. at a speed of 50 revolutions/min.

EXAMPLE 5

Not in Accordance with the Invention

Example 4 is repeated but with the addition not only of Luperox F40ED but also of 0.677 g of 4-hydroxy-2,2,6,6-tetramethylpiperidyloxy (OH-TEMPO).

EXAMPLE 6

Not in Accordance with the Invention

Example 5 is repeated but adding, instead of the OH-TEMPO, 0.5 g of N,N'-m-phenylenedimaleide (N,N'-m-phenylenebismaleimide or MBM).

EXAMPLE 7

Example 5 is repeated but with the addition not only of Luperox F40ED and OH-TEMPO but also of 0.5 g of MBM.

The invention claimed is:

1. A scorch retarding composition comprising a nitroxide and at least one crosslinking promoter comprising a group (P) comprising compounds containing at least one double bond.

2. The composition of claim 1, comprising the nitroxide in weight proportions ranging from 1:0.2 to 1:5 relative to the amount of crosslinking promoter present.

3. The composition of claim 1, further comprising a free-radical initiator comprising an organic peroxides, an azo compound, or mixtures thereof.

4. The composition of claim 3, comprising the free-radical initiator in weight proportions of from 1:0.02 to 1:1 relative to the amount of nitroxide present.

5. The composition of claim 3, comprising the free-radical initiator in weight proportions of from 1:0.02 to 1:1 relative to the amount of promoter used.

6. The composition of claim 3, further comprising a thermoplastic polymer and/or elastomeric polymer.

7. The composition of claim 6, wherein said polymer is crosslinked with a peroxide or an azo compound.

8. The composition of claim 7, wherein the free-radical initiator represents between 0.2 and 5 parts per 100 parts by weight of polymer.

9. The composition of claim 8, wherein said free radical initiator represents between 0.5 and 3 parts per 100 part by weight of polymer.

10. The composition of claim 1, wherein the nitroxide is represented by;

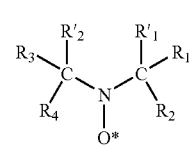

in which $R_1$, $R_2$, $R_3$, $R_4$, $R'_1$ and $R'_2$, which are identical or different, represent a hydrogen atom, a halogen atom, a linear, branched or cyclic, saturated or usaturated hydrocarbon-based group, a polymer chain comprising a polyalkyl (meth)acrylate chain, a polydiene, polyolefin or polystyrene chain, a functionalized group, an ester —COOR group, an amide —CON(R)₂ group, an alkoxy —OR group or a phosphonate —PO(OR)₂ group in which R represents a hydrogen-based chain containing from 1-9 carbon atoms.

11. The composition of claim 10, wherein said halogen atom is flourine, chlorine, bromine or iodine.

12. The composition of claim 10, wherein said hydrocarbon-based group is an alkyl or phenyl radical.

13. The composition of claim 10, wherein said polyalkyl (meth)acrylate chain is polymethyl methacrylate.

14. The composition of claim 10, wherein said functionalized group is a cyano —CN group.

15. The composition of claim 10, wherein $R'_1$ and $R'_2$ are linked together to form a ring comprising:

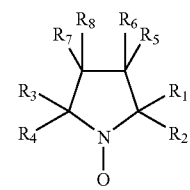

-continued

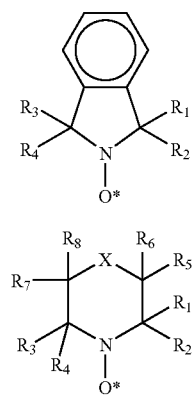

(V)

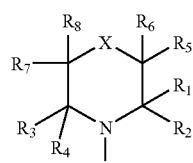

(VI)

in which $R_5$, $R_6$, $R_7$ and $R_8$, which are identical or different, comprise the same family of groups as those for $R_1$, $R_2$, $R_3$, and $R_4$ or represent a hydroxyl —OH group or an acid group; X in formula (VI) represents a divalent group comprising methylene, —CH$_2$—, —C(OR)(OR')—, carbonyl —C(O)—, oxy —O— or —CHZ— with Z representing a monovalent residue comprising cyano: —CN, amino: —NRR', alkoxy: —OR, iminoyl —N=CRR', carboxylate: —OC(O)—R or arminde: —NHR—C(O)R' groups, in which R and R', which may be identical or different, represent a hydrogen atom, a liner or branched alkyl group containing a number of carbon atoms ranging from 1 to 10, or benzyl or phenyl group.

16. The composition of claim 15, wherein said acid group is —COOH or —PO(OH)$_2$ or —SO$_3$H.

17. The composition of claim 15, wherein X in formula (VI) is phosphonate —OP(O)R"R'" with R" and R'" representing said Z.

18. The composition of claim 1, wherein the nitroxide is represented by the general formula (VII):

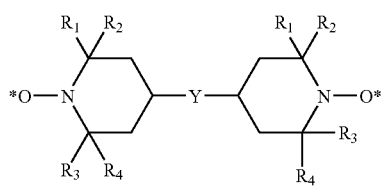

(VII)

in which $R_1$, $R_2$, $R_3$, $R_4$, which are identical or different, represent a hydrogen atom, a halogen atom, a linear, branched or cyclic, saturated or usaturated hydrocarbon-based group, a polymer chain comprising a polyalkyl (meth)acrylate chain, a polydiene, polyolefin or polystyrene chain, a functionalized group, an ester —COOR group, an anide —CON(R)$_2$ group, an alkoxy —OR group or a phosphonate —PO(OR)$_2$ group in which R represents a hydrogen-based chain containing from 1-9 carbon atoms, and Y represents a divalent group comprising:
—OC(O)—(CR$_a$R$_b$)$_n$—C(O))—,
—NH—(CR$_a$R$_b$)$_n$NH—,
—NHC(O)—(CR$_a$R$_b$)$_n$—C(O)NH—,
—S—, —O—, R$_a$ and R$_b$, which are identical or different, represent a hydrogen atom or a linar or branched alkyl radical containing a number of carbon atoms ranging from 1 to 10 and n represents an integer ranging from 0 to 20.

19. The composition of claim 1, wherein the nitroxide is represented by the general formula (VIII):

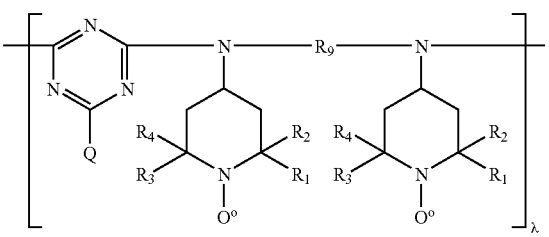

(VIII)

in which $R_1$, $R_2$, $R_3$, $R_4$, which are identical or different, represent a hydrogen atom, a halogen atom, a linear, branched or cyclic, saturated or usaturated hydrocarbon-based group, a polymer chain comprising a polyalkyl (meth)acrylate chain, a polydiene, polyolefin or polystyrene chain, a functionalized group, an ester —COOR group, an amide —CON(R)$_2$ group, an alkoxy —OR group or a phosphonate —PO(OR)$_2$ group in which R represents a hydrogen-based chain containing from 1-9 carbon atoms, $\lambda$ is an integer between 1 and 20, $R_9$ represents a alkylene group containing a number of carbon atoms ranging from 2 to 12 which are optionally interrupted with an —O— or —NR$_{10}$— with $R_{10}$ denoting hydrogen atom, an alkyl group containing a number of carbons between 1 and 12, or a cycloalkyl group, and Q represents a radical —OR$_{11}$, —NHR$_{12}$ or —NR$_{12}$R$_{13}$ in which $R_{11}$ represents a linear or branched alkyl radical containing a number of carbon atoms ranging from 1 to 12, a $C_3$-$C_{12}$ alkoxyalkyl radical, a cyclohexyl radical, a benzyl radical, a phenyl radical, a tolyl radical or a 2,2,6,6-tetrapiperidyl residue, $R_{12}$ and $R_{13}$, have the same meaning as $R_{11}$ or forms together with the nitrogen atom which bears them, a 5-, 6- or 7-member heterocyclic radical which optionally also contain an oxygen.

20. The composition of claim 1, wherein the nitroxide comprises:

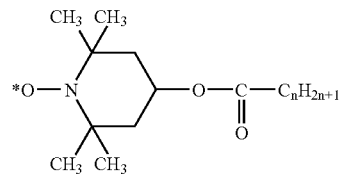

wherein n ranges from 1 to 20.

21. The composition of claim 1, wherein the nitroxide is 2,2,6,6-tetramethyl-1-piperidyloxy, 2,2,5,5-tetramethyl-1-pyrrolidinyloxy, bis(1-oxy-2,2,6,6-tetramethyl-4-piperidyl sebacate, 2,2,6-tetramethyl-4-hydroxy-1-piperidyloxy monophosphonate or 3-carboxy-2,2,5,5-tetramethylpyrrolidinyloxy.

22. The composition of claim 1, wherein the crosslinking promoter is trans-stilbene, divinylbenzene, trans, trans-2,6- dimethyl-2,4,6-octatriene, dicyclopentadiene, 3,7-dimethyl-1,3,6-octatriene (OCIMENE), a compound represented by the general formula (I):

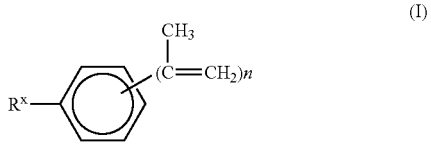

in which $R^x$ represents a hydrogen atom or an alkyl group of 1 to 9 carbon atoms and n is an integer between 1 and 3, or the compounds represented by the general formula (II):

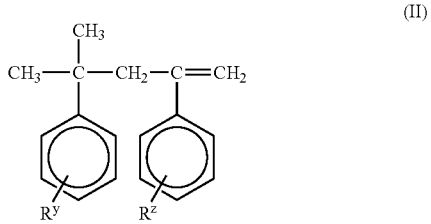

in which $R^y$ and $R^z$, which are identical or different, represent an alkyl group of 1 to 4 carbon atoms.

23. The composition of claim 22 wherein the crosslinking promoter is α-methylstyrene, ortho-, meta-, or para-diisopropenylbenzene, 1,2,4-triisopropenylbenzene, 1,3,5-triisopropenylbenzene, 3-isopropyl-ortho-diisopropenylbenzene, 4-isopropyl-ortho-diisopropenylbenzene, 4-isopropyl-m-diisopropenylbenzene, 5-isopropyl-m-diisopropenybenzene, 2-isopropyl-p-diisopropenylbenzene, 2,4-bis(3-isopropylphenyyl)-4-methyl-1-pentene, 2,4-bis(4-isopropylphenyyl)-4-methyl-1-pentene, 2-(3-isopropylphenyl)-4-(4isopropylphenyl)-4-methyl-1-pentene, 2-(4-isopropylpheny)-4-methyl-1-pentene, 2,4-bis(3-methylphenyl)-4-methyl-1-pentene or bis(4-methylphenyl)-4-methyl-1-pentene.

24. The composition of claim 3, wherein the free-radical initiator is dicumyl peroxide or α, α'—di[(t-butylperoxy)isopropyl]benzene.

25. The composition of claim 6, wherein the polymer is a linear low density polyethylene, low density polyethylene, high density polyethylene, chlorinated polyethylene, ethylene/propylene/butadiene terpolymers, ethylene/vinyl acetate copolymers, ethylene/propylene copolymers, silicone rubber, chlorosulphonated polyethylene, fluoroelastomers, ethylene/methyl(meth)acrylate copolymers or ethylene/glycidyl methacrylate copolymers.

26. A process for crosslinking a thermoplastic and/or elastomeric polymer, comprising mixing said polymer in the presence of a free-radical initiator, a nitroxide and a crosslinking promoter (P) comprising compounds containing at least one double bond, which may be difunctional or polyfunctional.

27. The process of claim 26, comprising converting the polymer into molded or extruded articles out during or after crosslinking.

28. Molded or extruded articles obtained according to the process of claim 27.

29. The composition of claim 19, wherein the 5-, 6-, or 7-membered heterocyclic radical contains an oxygen.

30. The composition of claim 1, wherein said at least one promoter comprises methyl methacrylate, lauryl methacrylate, allyl methacrylate, trimethylolpropane triacrylate, triallyl cyanurate (TAC), triallyl isocyanurate (TAIC), triallyl phosphate, tetraallyloxyethane, diallyldiglycol carbonate, triallyl trimellitate, trially citrate, diallyl adipate, diallyl terephthalate, dially oxalate, diallyl furmarate, ethylene glycol dimethacrylate, 2-hydroxyethyl methacrylate, or a combination thereof.

31. The process of claim 26, wherein said promoter (P) comprises methyl methacrylate, lauryl methacrylate, allyl methacrylate, trimethylolpropane triacrylate, triallyl cyanurate (TAC), triallyl isocyanurate (TAIC), triallyl phosphate, tetraallyloxyethane, diallyldiglycol carbonate, triallyl trimellitate, trially citrate, diallyl adipate, diallyl terephthalate, dially oxalate, diallyl furmarate, ethylene glycol dimethacrylate, 2-hydroxyethyl methacrylate, or a combination thereof.

* * * * *